(12) United States Patent
Kurata et al.

(10) Patent No.: US 8,727,622 B2
(45) Date of Patent: May 20, 2014

(54) SLIDING MEMBER

(75) Inventors: Ryoichi Kurata, Tochigi (JP); Kenzo Tadokoro, Tochigi (JP); Hideaki Tanibata, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/114,155

(22) PCT Filed: Apr. 25, 2012

(86) PCT No.: PCT/JP2012/061072
§ 371 (c)(1),
(2), (4) Date: Oct. 25, 2013

(87) PCT Pub. No.: WO2012/147781
PCT Pub. Date: Nov. 1, 2012

(65) Prior Publication Data
US 2014/0064641 A1   Mar. 6, 2014

(30) Foreign Application Priority Data
Apr. 26, 2011   (JP) .................................. 2011-098666

(51) Int. Cl.
*F16C 33/02*   (2006.01)
*F16C 33/10*   (2006.01)
(52) U.S. Cl.
USPC ................................. 384/42; 384/276; 384/13
(58) Field of Classification Search
USPC ....................... 384/7, 13, 26, 29, 42, 276, 293
See application file for complete search history.

(56) References Cited

U.S. PATENT DOCUMENTS

| 5,249,661 | A | 10/1993 | Kawamura et al. |
| 6,491,437 | B1 * | 12/2002 | Yamada et al. ............... 384/284 |
| 6,863,441 | B2 * | 3/2005 | Kawachi et al. .............. 384/276 |
| 7,290,936 | B2 * | 11/2007 | Tsuji et al. .................... 384/293 |
| 2002/0090155 | A1 | 7/2002 | Ushijima et al. |
| 2005/0281496 | A1 * | 12/2005 | Takahashi et al. .............. 384/13 |
| 2006/0083451 | A1 | 4/2006 | Kawagoe et al. |

FOREIGN PATENT DOCUMENTS

| CN | 1735755 A | 2/2006 |
| EP | 1207314 A2 | 5/2002 |
| EP | 1584828 A1 | 10/2005 |
| JP | H03-96715 | 4/1991 |
| JP | H05-106745 A | 1/1993 |
| JP | H05-1722 A | 4/1993 |

(Continued)

*Primary Examiner* — Thomas R Hannon
(74) *Attorney, Agent, or Firm* — Chernoff, Vilhauer, McClung & Stenzel, LLP (57) ABSTRACT

To provide a sliding member which can control a relationship between dynamic friction force and static friction force, a sliding member 1 constitutes a bearing having a cylindrical shape and its internal circumferential surface is a sliding layer 2 along a shaft. The sliding member 1 is provided a surface of the sliding layer 2 with uneven surface 6. The uneven surface 6 has the line-like projections 6a, vertexes of which are arranged in gridlike fashion, in the embodiment, to prevent an oil film from being formed and to make the dynamic friction force larger and keep the rate of change in the dynamic friction force in relation to the static friction force smaller. The sliding layer is configured so that a porous layer made of alloy material is formed on a surface of a metal substrate and the resin filled into the porous layer is sintered.

4 Claims, 5 Drawing Sheets

(56) References Cited

FOREIGN PATENT DOCUMENTS

| JP | 2002-188709 A | 7/2002 |
| JP | 2002-213612 A | 7/2002 |
| JP | 2004-156650 A | 6/2004 |
| JP | 2004-211859 A | 7/2004 |
| JP | 2006-226299 A | 6/2006 |
| JP | 2008-95745 A | 4/2008 |
| JP | 2010-210081 A | 9/2010 |

\* cited by examiner

SLIDING MEMBER

CROSS-REFERENCE TO RELATED APPLICATION

This is a national stage application filed under 35 U.S.C. §371 based on International Application No. PCT/JP2012/061072 filed Apr. 25, 2012, and claims priority under 35 U.S.C. §119 Japanese Patent Application No. 2011-098666 filed Apr. 26, 2011.

TECHNICAL FIELD

The present invention relates to a sliding member used in a bearing which slidably bears a shaft.

BACKGROUND ART

As the sliding member, any sliding materials in which a Cu—Sn alloy is bounded to a copper plated backing plate of steel have been often used. The sliding materials in which the Cu—Sn alloy is bounded to the copper plated backing plate of steel have been used for a sliding part using any oil. On the other hand, any sliding materials using resins have been used for a sliding part using no oil.

The conventional sliding member using the resins is configured so that a porous layer made of Cu—Sn alloy is formed on the copper plated backing plate of steel and polytetrafluoroethylene (PTFE) is filled into the porous layer. Such a sliding member into which the PTFE is filled may be used for a sliding member using the oil such as a shock absorber of a vehicle or the like.

The conventional sliding member is configured to have a smoothing sliding surface. On the other hand, a technology in which any grooves for reserving a lubricant have been provided in a sliding surface thereof to supply the lubricant to the sliding surface has been proposed (For example, see Patent Document 1). On the other hand, a technology in which a holding surface of columnar or cylindrical object is subjected to knurling to keep the object from deflecting has been proposed (For example, see Patent Document 2)

PRIOR ART DOCUMENTS

Patent Document

Patent Document 1: Japanese Patent application Publication No. 2002-188709
Patent Document 2: Japanese Patent application Publication No. H05-106745

DISCLOSURE OF THE INVENTION

Problems to be solved by the Invention

In a shock absorber constructed in a vehicle or the like, the sliding member has been used as a guide bushing for guiding a piston rod which has reciprocated by transmitting thereto any operations of a suspension mechanism varied following a variation of a road surface or the like.

The shock absorber damps any vibrations against an input from outside by using viscous damping of fluid. On the other hand, it has been understood that friction force occurring at the guide bushing for guiding the piston rod when reciprocating exerts any influence on any comfort of driving a vehicle or the like.

In other words, a relationship between static friction force acting on when a stopped piston rod starts moving and dynamic friction force acting on when the piston rod moves exerts any influence on any comfort of driving a vehicle or the like. However, in the conventional sliding member, a shape of the sliding surface thereof or the like is fixed in order to decrease the friction force so that there is no sliding member that can control the relationship between the static friction force and the dynamic friction force.

The invention has an object to present a sliding member that can control the relationship between the static friction force and the dynamic friction force.

Means for Solving the Problems

Inventors have found out that forming projections on a sliding surface so as to prevent an oil film from being formed under an oil-using circumference allows the relationship between the static friction force and the dynamic friction force to be controlled.

The invention relates to a sliding member which contains a sliding layer slidably bearing a slid member, the sliding layer being formed as uneven surface having a projection to prevent an oil film by sliding from being formed thereon, the projection being formed so that when the dynamic friction force is made larger, the dynamic friction force comes closer to the static friction force and the rate of change in the dynamic friction force in relation to the static friction force is kept smaller the uneven surface being formed on a cylinder-shaped internal circumferential surface thereof slidably bearing the slid member so as to have projection including a point-like vertex or a line vertex.

It is desirable to configure the uneven surface so that the projection in which the line-like vertex is arranged in gridlike fashion elongates toward an oblique direction in relation to a sliding direction of the slider member.

Additionally, it is desirable to configure the sliding member by forming on a surface of a metal substrate the sliding layer made of a metal material, a resin or a combination of the metal material and the resin, the sliding layer including a porous layer made of Cu—Sn alloy on the surface of the metal substrate, and by filling the resin into the porous layer and sintering the resin.

Effects of the Invention

According to the invention, by forming the uneven surface having a projection to prevent an oil film from being formed on the sliding layer, it is possible to make the dynamic friction force larger and keep the rate of change in the dynamic friction force in relation to the static friction force smaller. Further, it is possible to make the static friction force larger due to a shape of the uneven surface. This allows the comfort of driving a vehicle or the like to be improved when applying the sliding member according to the invention to the shock absorber.

BEST MODE FOR CARRYING OUT THE INVENTION

Figure 1:
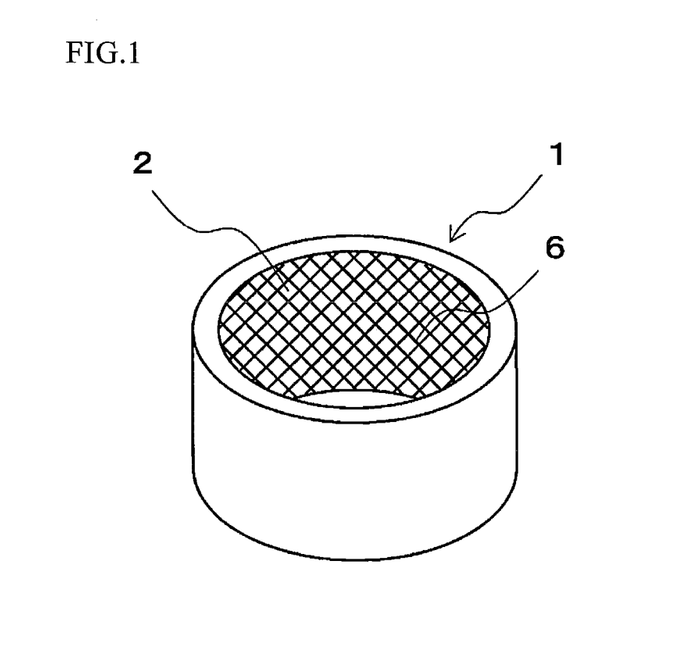
[FIG. 1] is a perspective view of a sliding member according to an embodiment of an invention.
Figure 2:
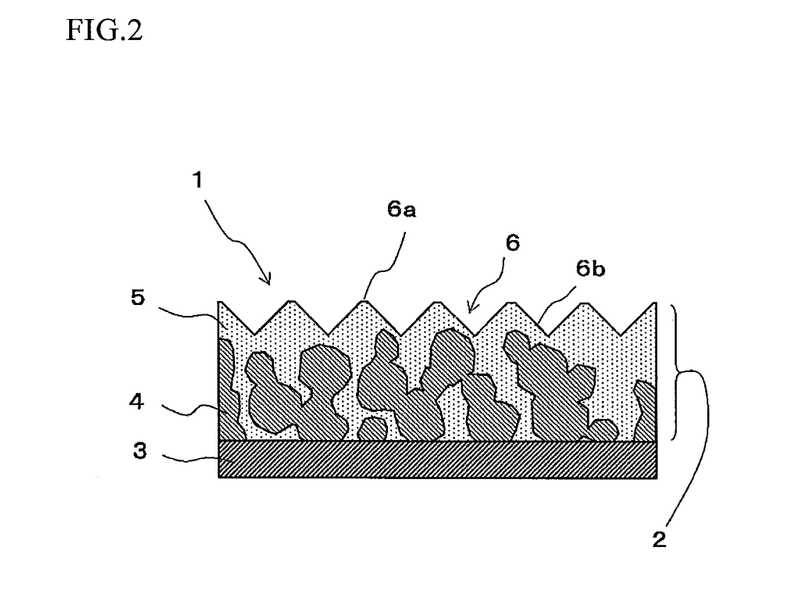
[FIG. 2] is a sectional view of the sliding member according to the embodiment for showing an example of schematic organization thereof.
Figure 3:
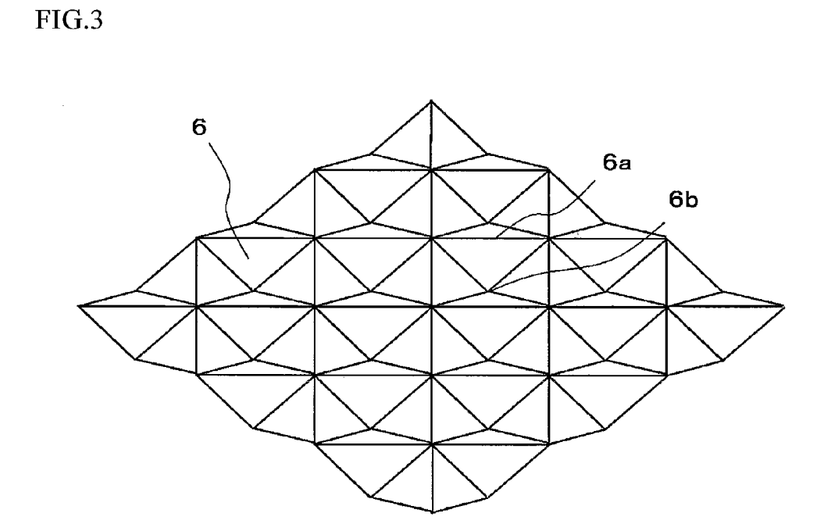
[FIG. 3] is a perspective view of a sliding surface of the sliding member according to the embodiment showing an example thereof.

The following will describe embodiments of a sliding member according to the present invention with reference to drawings. FIG. 1 is a perspective view of the sliding member according to an embodiment; FIG. 2 is a sectional view of the sliding member according to the embodiment for showing an example of schematic organization thereof; FIG. 3 is a perspective view of a sliding surface of the sliding member according to the embodiment showing an example thereof and FIG. 4 is a sectional view of the sliding member according to the embodiment for showing a using example thereof.

A sliding member 1 of the embodiment constitutes a bearing having a cylindrical shape as shown in FIG. 1 and an internal circumferential surface thereof is a sliding layer 2 along a shaft. The sliding member 1 is configured, as shown in FIG. 2, by forming on a surface of a metal substrate 3 a porous layer 4 made of alloy material, filling the resin into the porous layer 4 and sintering the resin 5 so that the sliding layer 2 is formed.

The sliding member 1 is provided with an uneven surface 6 on a surface of the sliding layer 2. In the embodiment, in order to prevent a surface of the sliding layer 2 from becoming a surface on which an oil film is formed, the uneven surface 6 is provided with projections 6a having any optional shape in which line-like vertexes in each line of which the vertexes are continuous are arranged in gridlike fashion as shown in FIG. 3, so that the formation of oil film can be controlled.

Figure 4:
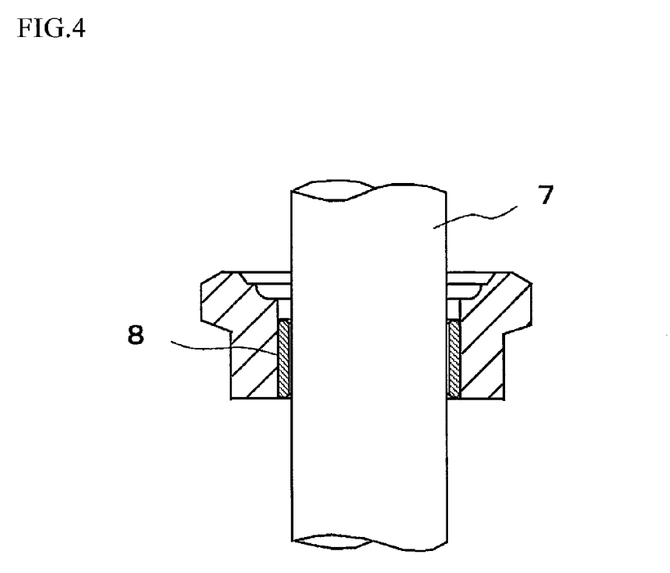
[FIG. 4] is a sectional view of the sliding member according to the embodiment for showing a using example thereof.

In a shock absorber mounted on a vehicle or the like, the sliding member 1 is used as a sliding portion in a guide bushing 8 which guides a piston rod 7 reciprocating by transmitting thereto an operation of a suspension mechanism varied following any variations in a road surface, as shown in FIG. 4. Since in the sliding member 1, the sliding surface along the piston rod 7 is configured as the uneven surface 6 providing with the projections 6a shown in FIG. 3, there is a line contact in the embodiment, not surface contact which causes an oil film to be formed between the sliding member and the piston rod 7 when sliding the piston rod 7. The uneven surface 6 is configured so to have a shape such that the projections 6a elongate toward an oblique direction in relation to a sliding direction of the piston rod 7.

Figure 5:
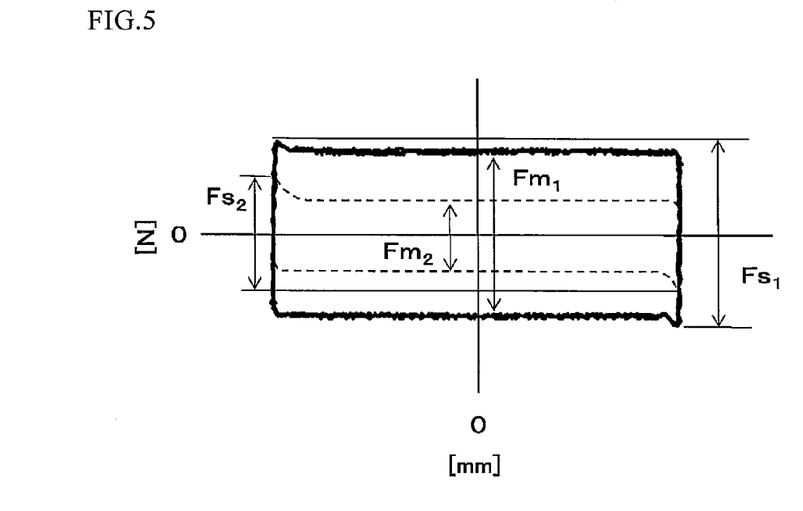
[FIG. 5] is a graph showing a relationship between the static friction force and the dynamic friction force.

FIG. 5 is a graph showing a relationship between the static friction force and the dynamic friction force. In FIG. 5, a vertical axis indicates friction force (N) and a horizontal axis indicates a stroke (mm). In the shock absorber used for the vehicle or the like, the piston rod reciprocates based on that the suspension follows the variations or the like of the road surface. Based on a fact such that the piston rod reciprocates, there is a state where the piston rod stands still.

Thus, in the guide bushing 8 used for the shock absorber, when a dynamic friction force $Fm_2$ is small and the rate of change in the dynamic friction force $Fm_2$ in relation to the static friction force $Fs_2$ is large, as shown in broken lines of FIG. 5, it is felt uncomfortable to ride in the vehicle or the like. As opposed to this, when a dynamic friction force $Fm_1$ is large and the rate of change in the dynamic friction force $Fm_1$ in relation to the static friction force $Fs_1$ is small, it is improved to be more comfortable to ride in the vehicle or the like.

Accordingly, in the sliding member 1 constituting the guide bushing 8, the uneven surface 6 having the projections 6a for preventing the oil film from being formed on the sliding surface along which the piston rod 7 shown in FIG. 4 contacts and which guides the reciprocation movement of the piston rod 7.

The uneven surface 6 has larger static friction force $Fs_1$ than that of a case where the sliding surface along which the piston rod 7 contacts is smooth, based on orientation, numbers, dimension of the projections 6a and the depressions 6b. It is desirable that the uneven surface 6 has a shape such that the projections 6a elongate toward an oblique direction in relation to a sliding direction of the piston rod 7. Further, when the sliding surface along which the piston rod 7 contacts is smooth, the sliding of the piston rod 7 causes the oil film to be formed between the sliding surface and the piston rod 7 so that the dynamic friction force is lowered. On the other hand, the projections 6a are formed on the sliding surface along which the piston rod 7 contacts so that the oil film based on the sliding of the piston rod 7 is prevented from being formed. When the dynamic friction force $Fm_1$ is made larger, the dynamic friction force $Fm_1$ comes closer to the static friction force $Fs_1$ so that the rate of change in the dynamic friction force $Fm_1$ in relation to the static friction force $Fs_1$ is kept smaller. Further, since the guide bushing 8 is used in the oil, a lubricant quality thereof is maintained because the oil stands between the rod and the depressions 6b of the uneven surface 6.

In the sliding member 1 of the embodiment, the sliding layer 2 in which the uneven surface 6 is formed on the sliding surface thereof is configured by PTFE as resin 5. PTFE has a coefficient of friction $\mu_1$ of about 0.1 while the oil used in the shock absorber has a coefficient of friction $\mu_2$ of about 0.01. In a state where the piston rod stands still, any oil film is not formed between the piston rod and the guide bushing and the static friction force Fs is influenced by the coefficient of friction $\mu_1$ of PTFE.

On the other hand, when the oil film is formed between the piston rod and the guide bushing based on the sliding of the piston rod, the dynamic friction force Fm is influenced by the coefficient of friction $\mu_2$ of the oil so that the dynamic friction force Fm is lowered and the rate of change in the dynamic friction force Fm in relation to the static friction force Fs becomes larger.

Accordingly, in the sliding member 1, the projections 6a of the uneven surface 6 formed on the sliding surface along the piston rod 7 prevent any oil film from being formed when the piston rod 7 slides so that the dynamic friction force $Fm_1$ is also influenced by the coefficient of friction $\mu_1$ of PTFE and the rate of change in the dynamic friction force $Fm_1$ in relation to the static friction force $Fs_1$ is kept smaller.

Figure 6:
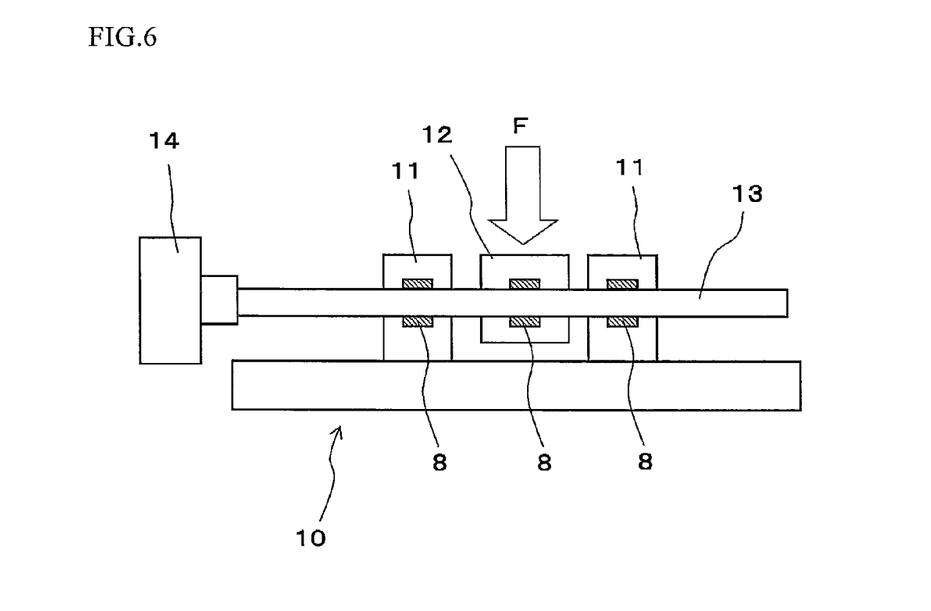
[FIG. 6] is a diagram for showing a configuration of an example of a testing machine for measuring the static friction force and the dynamic friction force.

FIG. 6 is a diagram for showing a configuration of an example of a testing machine for measuring the static friction force and the dynamic friction force. In a testing machine 10, the guide bushings 8 to be tested are mounted in bearing bases 11 and a load portion 12. Any traverse loads are applied to the load portion 12 through the guide bushing 8 between the bearing bases 11 bearing the rod 13 through the guide bushings 8. Friction force when vibrating the rod 13, to which the traverse load has been applied, by a vibrator, not shown, is measured by a load cell 14. Table 1 indicates results when measuring the static friction force Fs and the dynamic friction force Fm. In table 1, each of the sliding members of the embodiment is configured so that the sliding layer 2 is constituted of the porous layer 4 made of metal material and the resin 5, as shown in FIG. 2, the resin 5 being constituted of PTFE. The uneven surface 6 including the projections 6a is formed on the sliding surface which is a surface of the sliding layer 2. Each of the sliding members, not shown, of comparison example is configured so that the sliding layer is constituted of the porous layer made of metal material and the resin, the resin being constituted of PTFE. The sliding surface thereof is smooth.

Test Condition
Mating Member: S45C+Hard chromium plating, and surface roughness Rz of 0.3 µm;
Vibrator: 0.001 m/sec (stroke of 5 mm);
Traverse Loads: 10 kgf, 20 kgf and 30 kgf; and
Lubricating Oil: oil for shock absorber

TABLE 1

| | TRAVERSE LOADS (N) | STATIC FRICTION FORCE Fs (N) | DYNAMIC FRICTION FORCE $F_m$ (N) | RATE OF CHANGE |
|---|---|---|---|---|
| EMBODIMENTS | 98 | 19.49 | 16.99 | −13% |
| | 196 | 30.49 | 25.49 | −16% |
| | 294 | 41.48 | 34.49 | −17% |
| COMPARISON EXAMPLES | 98 | 12.99 | 10.25 | −21% |
| | 196 | 17.99 | 13.49 | −25% |
| | 294 | 21.99 | 16.99 | −23% |

As shown in the table 1, it is understood that the sliding members of the embodiment forming the uneven surface 6 in the sliding surface keep the rate of change in the dynamic friction force Fm in relation to the static friction force Fs smaller than those of the sliding members of the comparison example having the smooth sliding surface. When performing tests with the loads varying, the similar results are given in all of the loads.

Figure 7A:
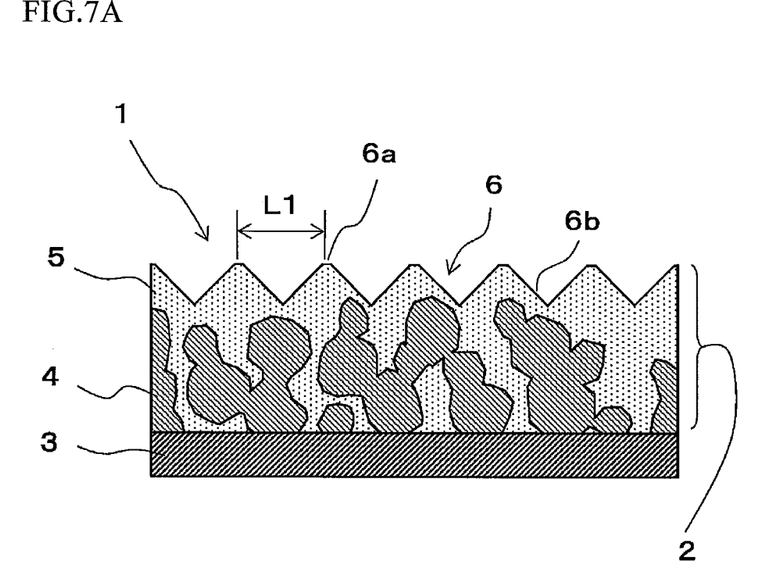
[FIG. 7A] is a diagram for showing a relationship between dimensions of a projection and a depression in uneven surface and friction force.
Figure 7B:
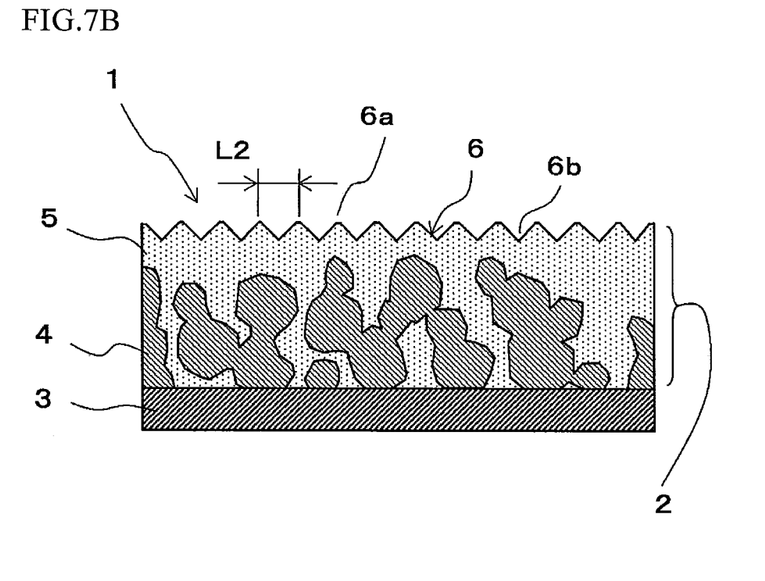
[FIG. 7B] is a diagram for showing a relationship between dimensions of a projection and a depression in the uneven surface and friction force.

Next, the following will study a relationship between a shape of the uneven surface constituting the sliding surface and the friction force. FIGS. 7A and 7B are diagrams each for showing a relationship between dimensions of a projection and a depression in the uneven surface and the friction force. FIG. 7A schematically shows an example in which a space L1 between the projections 6a is about 0.1 mm. FIG. 7B schematically shows an example in which a space L2 between the projections 6a is about 0.06 mm.

As described above, in the sliding member 1 constituting the guide bushing 8, the sliding layer 2 is configured by the resin 5, in the embodiment, PTFE. Accordingly, when applying the traverse force F to the piston rod 7, the shape of sliding layer 2 is changed. Under the condition where the piston rod 7 stands still, a contact area thereof when changing the shape by the traverse force F remains unchanged as compared with a case of no load. Accordingly, the static friction force $Fs_1$ remains unchanged regardless of the dimensions of the projection and the depression in the uneven surface.

On the other hand, when the piston rod 7 reciprocates, adjacent projections 6a do not interfere with each other in a case where the space between the projections 6a is large, as shown in FIG. 7A, and an amount of change is large while the adjacent projections 6a interfere with each other in a case where the space between the projections 6a is small, as shown in FIG. 7B, and an amount of change is small. Accordingly, there is a tendency such that the larger the space between the projections 6a is, the larger the dynamic friction force $Fm_1$ is.

From the above, it has been understood that the friction force can be controlled in addition to a function to guide the piston rod 7 by providing the sliding surface of the guide bushing 8 with the uneven surface. Further, it has been understood that regarding a dimensional relationship of the space between the projections 6a of the uneven surface 6, the larger space is good.

Figure 8:
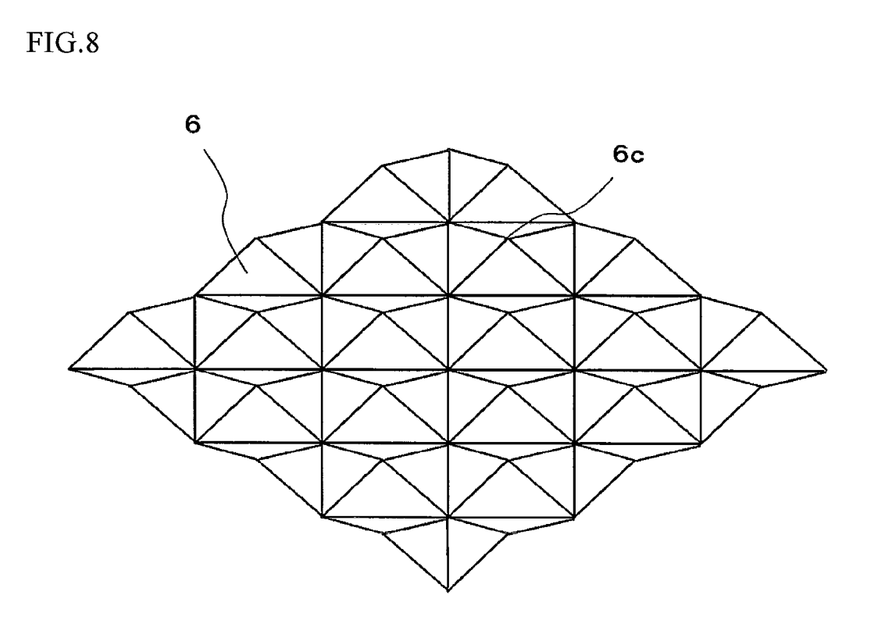
[FIG. 8] is a perspective view of a sliding surface of the sliding member according to another embodiment.

The uneven surface 6 formed in the surface of the sliding layer 2 is not limited to the shape thereof shown in FIG. 3: For example, the shape thereof such that the projections 6a elongate in parallel with the sliding direction of the piston rod 7 may be configured, or the combination with the depressions having optional shapes such as a quadrangular pyramid shape, a triangular pyramid shape or circular cone shape may be configured. Further, the combination with the projections having optional shapes such as a quadrangular pyramid shape, a triangular pyramid shape or circular cone shape may be configured. FIG. 8 is a perspective view of a sliding surface of the sliding member according to another embodiment. For example, as shown in FIG. 8, the uneven surface 6 may be configured by combining projections 6c each having a quadrangular pyramid shape with point-like vertex in order to prevent the oil film from being formed.

The following will describe an outline of a manufacturing method of the sliding member 1 of the embodiment.
(a) Spraying Cu—Sn alloy powder onto copper plated backing plate of steel which is the metal substrate 3;
(b) Sintering the copper plated backing plate of steel onto which the Cu—Sn alloy powder has been sprayed in a sintering furnace so that the porous layer made of Cu—Sn alloy is formed on the copper plated backing plate of steel;
(c) After PTFE dispersion as resin basis and filler such as molybdenum disulfide, graphite, carbon fiber and the like as resin additives have been mixed, filling resin molding obtained by adding an organic solvent thereto and stirring it into the porous layer by pressing the resin molding with an indent roller having uneven shape; and
(d) Heating the one obtained by filling the resin molding into the porous layer to form the uneven shape which is the uneven surface in the sintering furnace at a temperature over a melting point of PTFE to sinter PTFE.

Thus, the porous layer 4 made of Cu—Sn alloy is formed on a surface of the metal substrate 3, PTFE which is the resin filled into the porous layer 4 is sintered and the sliding layer 2 providing a surface thereof with the uneven surface 6 is formed.

Industrial Applicability

The present invention may be applied to a sliding member used under an oil-supplying circumference.

DESCRIPTION OF CODES

1 . . . Sliding Member; 2 . . . Sliding Layer; 3 . . . Metal Substrate; 4 . . . Porous Layer; 5 . . . Resin; 6 . . . Uneven Surface; 6a . . . Projections

The invention claimed is:

1. A sliding member characterized in that the sliding member comprises a sliding layer slidably bearing a slid member, the sliding layer being formed as uneven surface having a projection to prevent an oil film by sliding from being formed thereon, the projection being formed so that when the dynamic friction force is made larger, the dynamic friction force comes closer to the static friction force and the rate of change in the dynamic friction force in relation to the static friction force is kept smaller, the uneven surface being formed on a cylinder-shaped internal circumferential surface thereof slidably bearing the slid member so as to have a projection including a point-like vertex or a line-like vertex.

2. The sliding member according to claim 1 characterized in that the uneven surface is configured so that the projection in which the line-like vertex is arranged in gridlike fashion elongates toward an oblique direction in relation to a sliding direction of the slid member.

3. The sliding member according to claim 1 characterized in that the sliding member is configured by forming on a surface of a metal substrate the sliding layer made of a metal material, a resin or a combination of the metal material and the resin, the sliding layer including a porous layer made of Cu—Sn alloy on the surface of the metal substrate, and by filling the resin into the porous layer and sintering the resin.

4. The sliding member according to claim 2 characterized in that the sliding member is configured by forming on a surface of a metal substrate the sliding layer made of a metal material, a resin or a combination of the metal material and the resin, the sliding layer including a porous layer made of Cu—Sn alloy on the surface of the metal substrate, and by filling the resin into the porous layer and sintering the resin.

* * * * *